(No Model.)

W. MASON.
DRILL CHUCK.

No. 323,179. Patented July 28, 1885.

Witnesses
J. H. Shumway
Jos. C. Earle

Wm. Mason
Inventor
By atty
Wm. C. Earle

UNITED STATES PATENT OFFICE.

WILLIAM MASON, OF NEW HAVEN, CONNECTICUT.

DRILL-CHUCK.

SPECIFICATION forming part of Letters Patent No. 323,179, dated July 28, 1885.

Application filed April 20, 1885. (No model.)

*To all whom it may concern:*

Be it known that I, WILLIAM MASON, of New Haven, in the county of New Haven and State of Connecticut, have invented new Improvements in Drill-Chucks; and I do hereby declare the following, when taken in connection with accompanying drawings, and the letters of reference marked thereon, to be a full, clear, and exact description of the same, and which said drawings constitute part of this specification, and represent, in—

Figure 1:
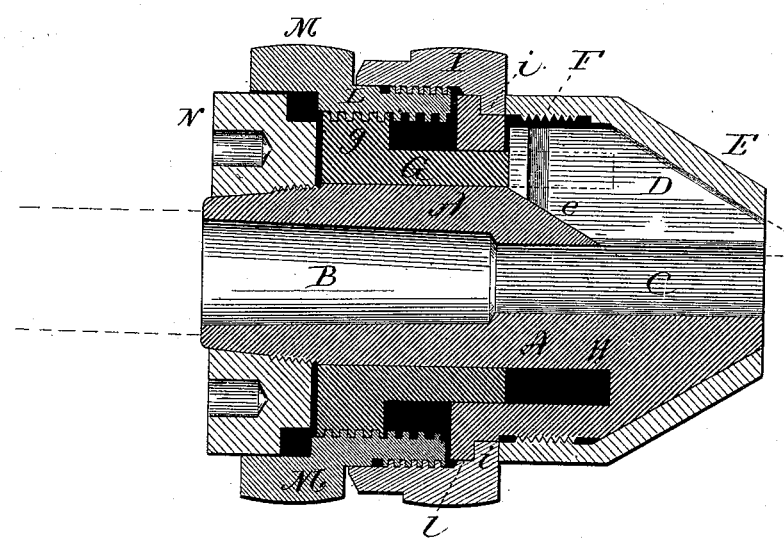
Figure 2:
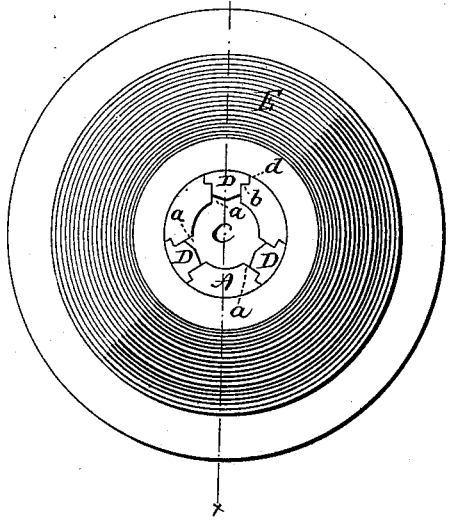
Figure 3:
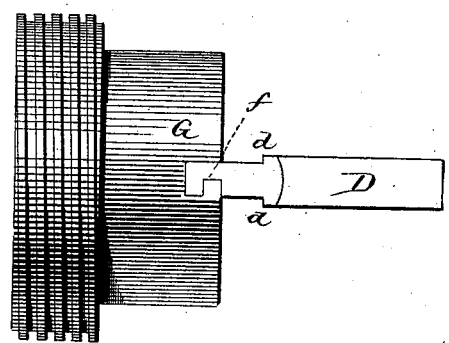

Figure 1, a vertical central section of the chuck, showing a side view of one jaw, cutting on line $x\ x$ of Fig. 2; Fig. 2, a front end view; Fig. 3, the sleeve G and one jaw detached, showing the connection between the sleeve and jaws.

This invention relates to an improvement in that class of chucks which are adapted to be fixed to the mandrel of a lathe, and by which drills or small articles may be held and rotated with the mandrel, the chuck being adjustable to various sizes of articles to be held, and is an improvement upon the invention described in application filed January 12, 1885, Serial No. 152,583.

In the usual construction of this class of chucks three jaws are arranged around the center in connection with the body of the chuck to prevent longitudinal movement, but free for radial movement. They are supported in the head of the chuck, the head arranged to move longitudinally on the body of the chuck. The backs of the jaws are inclined inward and forward, and the head of the chuck correspondingly contracted, so that as the head is moved longitudinally on the body the jaws will be moved radially from each other or radially toward each other, according to the direction in which the head is turned. This is a common and well-known construction.

In the more general construction of this class of chucks the head is internally screw-threaded and the body of the chuck correspondingly screw-threaded upon its circumference, so that the head is moved longitudinally on the body by rotating the one and holding the other.

In the practical use of chucks the adjustment is made in the lathe, the body revolving with the mandrel of the lathe. The head is held by the hand of the operator, so that the workman turns the mandrel accordingly as he desires to move the jaws out or in. The grasping force of the jaws upon the shank of the drill, or whatever it may be, is therefore only such as can be produced by hand. If the screw be very fine, so as to increase this power, then the movement will be so slow as to be objectionable. It is desirable to make the movement whereby the grasping or releasing of the jaws is produced as quickly as possible, yet that it should be safe and strong.

In another application, Serial No 152,583, I have constructed a chuck having the head movable longitudinally on the body, so as to open or close the jaws, as the case may be, as before described. In that invention I have provided a differential screw, whereby the movement of the head may be made quick or slow, and so that for a considerable adjustment the quick movement may be employed, and then the slow movement applied, so as to give a strong firm grip upon the jaws.

The object of my present invention is to construct the chuck so that the head shall be stationary upon the body and the jaws moved longitudinally, thus applying my invention to another class of chucks; and it consists, principally, in a body having longitudinal recesses to receive the jaws, and so constructed that they may have therein both longitudinal and radial movement, with a head surrounding the jaws, contracted upon its inside toward its outer end, so that the longitudinal movement of the jaws will, because of the contracted or inclined inner surface of the head, cause said jaws to move radially toward or from each other, according to the direction of the longitudinal movement of the jaws, combined with a sleeve on the body adapted for longitudinal movement, and in connection with the jaws, whereby the longitudinal movement of the sleeve will be imparted to the jaws, and a differential screw in connection with said sleeve, whereby either a rapid or a slow movement may be imparted to said sleeve, and as more fully hereinafter described.

A represents the body of the chuck, which is constructed with a cavity, B, to receive a shank, by which it may be applied to the lathe; or it may be constructed with a shank to enter the lathe, as indicated in broken lines, Fig. 1. At its outer end it is constructed of conical shape and with a concentric opening, C.

At several points in the forward or contracted portion of the body radial longitudinal slots a are formed to receive the jaws D. Over the contracted portion of the body the head or cap E is applied. This cap is constructed upon its inner surface corresponding to the conical shape of the body, and so as to fit thereon, and is applied to the body by screw-threads on the exterior of the body, corresponding to the screw-threads on the interior of the head, as at F. The radial slots a are constructed with shoulders b on the inclined surface of the body, and the jaws with corresponding flange, d, in the usual manner of forming the bearing for jaws in this class of chucks.

The bottom of the recesses in the body which receive the jaws is inclined, as at e, parallel with the inclined surface of the body and the inner surface of the head, as seen in Fig. 1. The jaws D have their outer and lower edges correspondingly inclined, as also seen in Fig. 1, so that the jaws as they move outward will run down the incline e as they do down the incline on the outer surface of the body, as indicated in broken lines, Fig. 1.

Upon the body a sleeve, G, is applied concentric with the axis of the body, so as to move longitudinally thereon. It extends into a concentric groove, H, in the body and within the space occupied by the jaws. The rear ends of the jaws are each constructed with a groove, f, forming a hook-shaped end, and the sleeve G is constructed with a radial recess corresponding to the rear end of the jaws, so as to interlock therewith, as seen in Fig. 3, and so that longitudinal movement imparted to the sleeve G will be communicated to the jaws D—that is to say, as the sleeve G is moved outward, the jaws will be correspondingly moved outward, and thereby closed; or if the sleeve be moved inward, the jaws will be drawn inward, and correspondingly open.

On the outer surface of the sleeve a screw-thread is formed, preferably by constructing the sleeve with an annular flange, g, screw-threaded upon its periphery.

I is a sleeve arranged outside the body, so as to turn freely thereon. It is best applied by constructing it with an internal annular flange, i, to set against the corresponding flange, l, on the body, and between the said flange l and the head, so that when the head is in place it will hold the sleeve I against longitudinal movement, but yet permit its rotation. The inner surface of the sleeve I is screw-threaded, but the pitch of the thread less than the pitch of the thread on the sleeve G, and of somewhat greater internal diameter than the external diameter of the thread on the sleeve G. Between the sleeve I and the sleeve G a third sleeve, L, is introduced, screw-threaded upon its interior corresponding to the thread on the sleeve G, and upon its exterior with a thread corresponding to the internal thread of the sleeve I. The sleeve L is constructed with an annular projection, M, at the inner end of the sleeve I, and so as to stand in a convenient position for the workman to apply his hand to turn the said sleeve L, as seen in Fig. 1.

Now, if the sleeve I be rotated, its internal thread will work into the thread on the sleeve L, and move that sleeve away from or toward the sleeve I, according to the direction in which the said sleeve I is turned, the movement of the sleeve corresponding to the pitch of the thread in the sleeve I. If the sleeve L be not rotated at the same time, then the longitudinal movement imparted to the sleeve L will be communicated to the sleeve G, thence to the jaws. If the operator grasp both the sleeves I and L, so as to rotate them simultaneously and as one, then there will be no movement between the sleeves I and L, but the sleeve G will move under the influence of the thread in the sleeve L. The movement by the sleeve I alone will be slow, and the movement by the two sleeves together will be as much quicker as the pitch of the internal thread of the sleeve L is greater than the pitch of the external thread.

Again, if the sleeve I be held from rotation and the sleeve L be rotated, it will move from the sleeve I according to the pitch of the thread in the sleeve I, and under such movement will take with it the sleeve G; but at the same time the sleeve L is moving its internal thread of greater pitch is working in the thread of the sleeve G, and therefore moves the sleeve G according to the thread between the sleeves L and G minus the pitch of the thread between the sleeves I and L.

If a quick movement of the jaws is desired—as for a considerable change—the two sleeves I and L are moved together, thus giving to the sleeve G and the jaws their quickest longitudinal movement; but so soon as the jaws are brought to a bearing or near the point where they are to rest, then the sleeve I, held from rotation, and the sleeve L, rotated, will impart to the sleeve G a very slow movement, but with a correspondingly-increased power, so that the jaws will be forced into their grasping position under such increased force, thereby increasing the force of the grasp of the jaws to the extent of the differential screw-threads on the sleeve L.

In relieving the grasp of the jaws the same increase of power is attained by first turning the sleeve L to start the jaws, then turning the two sleeves L and I together to give the quick movement to the jaws.

By constructing the inner edge of the recesses which receive the jaws inclined, as at e, Fig. 1, parallel with the incline of the surface of the head and path of movement of the jaws, I form a support for the rear end of the jaws, which prevents the tendency of the outer or nose end of the jaws to turn upward when grasped upon an article having a bearing only at or near the nose end of the jaws, thus relieving the flanges of the jaws from a great portion of their strain. In some cases this inclined bottom or lower edge, e, of the recess may enable me to dispense entirely with the flange on the jaws. This inclined bearing-surface e for the jaws may be applied to chucks in which the jaws are adapted to move longitudinally, but in which such movement is imparted by other mechanism than that which I have described.

In the class of chucks in which a central conical-shaped cavity, B, is employed for the attachment of the chuck, the force tending to split the body is very great, and as the sleeve G must pass on over the body from its rear end it is desirable to provide a protection for that rear end of the body of the chuck. To do this, I construct the rear end portion of conical shape upon its exterior and apply to it a ring, N, having its interior of corresponding conical shape, so as to fit closely upon the body, the exterior of the body screw-threaded and the interior of the ring correspondingly screw-threaded, so that the ring may be placed upon the body to give the necessary support to that end of the body.

I claim—

1. In a drill-chuck, the combination of the body A, constructed of conical shape at its forward end, and with radial recesses at the said forward end, a head, E, over said forward end correspondingly inclined upon its inner surface, jaws D, arranged in said radial recesses, free for longitudinal and radial movement therein, a sleeve, G, surrounding the said body and free for longitudinal movement thereon in rear of the jaws, but in connection therewith, and so that a longitudinal movement of said sleeve G will be imparted to said jaws, a second sleeve, I, arranged around the body outside the said sleeve G, free for rotation, but fixed as to longitudinal movement, and an intermediate sleeve, L, between said sleeves I and G, said sleeve L constructed upon its inner surface with a screw-thread corresponding to the thread upon the exterior of the sleeve G, and so as to engage therewith, and the said sleeve L constructed with a screw-thread to engage a corresponding screw-thread in the sleeve I, the pitch of the thread on the said sleeves I and G and the corresponding threads on the sleeve L being greater the one than the other, and whereby the said intermediate sleeve forms a differential screw between the sleeves I and G, substantially as described.

2. In a drill-chuck provided with longitudinally and radially movable jaws at its outer end and with a sleeve arranged on the said body and movable longitudinally thereon in connection with said jaws, the said body constructed with a cavity at its rear end to receive the plug, the surface of the said chuck around the rear end of said cavity of conical shape, combined with a ring, N, its inner surface of correspondingly conical shape and set over said rear end of the body, substantially as described.

WILLIAM MASON.

Witnesses:
JOHN E. EARLE,
J. H. SHUMWAY.